United States Patent
Nagisetty et al.

(10) Patent No.: US 10,276,002 B2
(45) Date of Patent: Apr. 30, 2019

(54) APPARATUS AND METHOD FOR MODIFYING A HAPTIC OUTPUT OF A HAPTIC DEVICE

(71) Applicant: Intel Corporation, Santa Clara, CA (US)

(72) Inventors: Ramune Nagisetty, Portland, OR (US); Robert Flory, Forest Grove, OR (US); Giuseppe Beppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 15/406,319

(22) Filed: Jan. 13, 2017

(65) Prior Publication Data

US 2018/0204426 A1    Jul. 19, 2018

(51) Int. Cl.
*G08B 6/00* (2006.01)
*H04B 1/3827* (2015.01)
*G06F 3/01* (2006.01)

(52) U.S. Cl.
CPC ............... *G08B 6/00* (2013.01); *G06F 3/016* (2013.01); *H04B 1/385* (2013.01)

(58) Field of Classification Search
None
See application file for complete search history.

(56) References Cited

U.S. PATENT DOCUMENTS

| 2004/0108824 | A1* | 6/2004 | Ueda | H02P 25/032 318/114 |
| 2013/0106589 | A1 | 5/2013 | Posamentier | |
| 2014/0320402 | A1* | 10/2014 | Stahlberg | G08B 6/00 345/156 |
| 2015/0123776 | A1* | 5/2015 | Lee | G06F 3/016 340/407.2 |
| 2015/0130730 | A1 | 5/2015 | Harley et al. | |
| 2015/0324049 | A1* | 11/2015 | Kies | G06F 3/0414 345/156 |
| 2015/0366624 | A1* | 12/2015 | Kostrzewski | A61B 17/3421 606/130 |
| 2016/0259480 | A1 | 9/2016 | Augenbergs et al. | |
| 2017/0205883 | A1* | 7/2017 | Tanaka | G06F 3/016 |

FOREIGN PATENT DOCUMENTS

WO    2015127119    8/2015

OTHER PUBLICATIONS

International Searching Authority, "International Search Report," issued in connection with International Patent Application No. PCT/US2017/060425, dated Feb. 5, 2018, 4 pages.
International Searching Authority, "Written Opinion," issued in connection with International Patent Application No. PCT/US2017/060425, dated Feb. 5, 2018, 9 pages.

* cited by examiner

*Primary Examiner* — Brent Swarthout
(74) *Attorney, Agent, or Firm* — Hanley, Flight & Zimmerman, LLC

(57) ABSTRACT

An example wearable device includes a haptic actuator to produce an output haptic vibration in response to a target input signal waveform, a haptic effect sensor located in proximity to the haptic actuator to measure a haptic vibration corresponding to the output haptic vibration and to output a measured haptic vibration waveform and a feedback circuit to modify the target input signal waveform to reduce a difference between the output haptic vibration and a measured haptic vibration waveform.

14 Claims, 9 Drawing Sheets

APPARATUS AND METHOD FOR MODIFYING A HAPTIC OUTPUT OF A HAPTIC DEVICE

TECHNICAL FIELD

This disclosure relates to haptic devices and, more particularly, to apparatus and methods for modifying a haptic output of a haptic device.

BACKGROUND

In recent years, haptic devices including haptic actuators have been implemented in smart phones and smart watches to output haptic vibrations to provide haptic effects conveying information to a user of the device. The haptic actuator outputs vibrations which stimulate nerves in the user's skin and create a sensation that may be used to convey information. For example, a haptic actuator of a cell phone vibrates in a first mode when a call is incoming and vibrates in a second mode when a text is incoming. As another example, a haptic actuator of a cell phone may be configured to vibrate in a first mode to indicate that a first contact in a contact list is calling and to vibrate in a second mode to indicate that a second contact in the contact list is calling. In still another example, a haptic actuator of a smart watch vibrates in a first mode to indicate an alarm and vibrates in a second mode to indicate an email is incoming.

Figure 1:
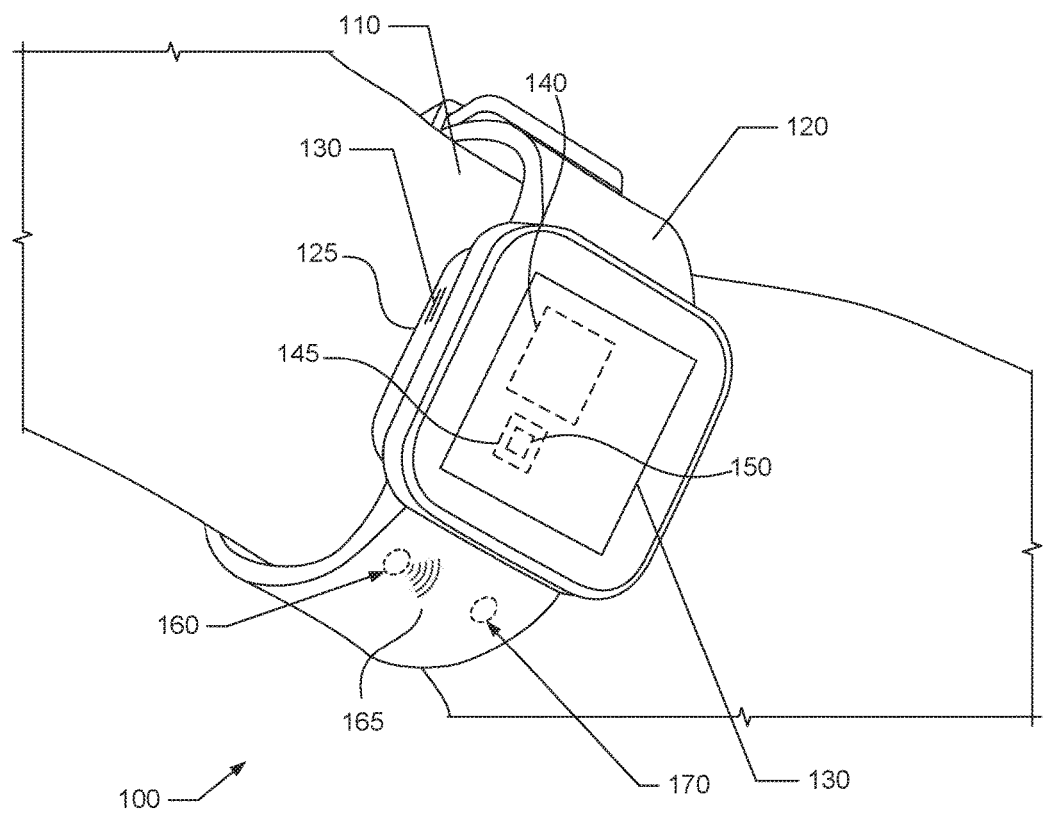
FIG. 1 depicts an example user wearing an example wearable device including an example haptic device.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

In the following description, numerous specific details are set forth to provide an understanding of various embodiments. However, it will be understood by those of ordinary skill in the art that the various embodiments may be practiced without the specific details. In other instances, well-known methods, procedures, components, and circuits have not been illustrated or described in detail so as not to obscure the particular embodiments.

Haptic actuators apply forces (e.g., vibrations) to a user's skin to produce a haptic sensation that depends on the characteristics of the haptic actuators, a location of contact between the haptic actuators and the user, and a degree of coupling between the haptic actuators and the user (e.g., a normal force biasing the haptic actuators against the skin of a user). Thus, for the same haptic actuator output (e.g., a same input excitation signal waveform), the haptic sensations or haptic effects perceived by the user can differ depending on how a wearable haptic device including the haptic actuator is worn (e.g., tight to the skin, loose, etc.) or how firmly a handheld haptic device including the haptic actuator is held. In some cases, the variability in positioning of a wearable haptic device or variability in holding or conveying a handheld haptic device may cause a desired haptic effect from the haptic actuator(s) not to be felt at all or not to be felt by the user in the manner intended. By way of example, a vibrating phone in a user's jacket may not be felt. In other examples, variability in positioning of the haptic device causes the desired haptic effect from the haptic actuator(s) to be accompanied by harmonic frequencies that result in annoying haptic sensations and unwanted acoustic noise. Ultimately, a particular haptic effect from the haptic actuator(s) is intended to be felt by the user.

As taught herein, some example haptic devices include a haptic actuator to produce an output haptic vibration in response to a target input signal waveform (e.g., a desired haptic vibration waveform, etc.), a haptic effect sensor located in proximity to the haptic actuator to measure a haptic vibration at the location of the haptic effect sensor (e.g., a haptic vibration related to the output haptic vibration from the haptic actuator), and a feedback circuit to modify the target input signal waveform to the haptic actuator to reduce a difference between the output haptic vibration and a measured haptic vibration. The difference between the output haptic vibration and the measured haptic vibration can include any difference. For example, the difference may include any difference(s) definable to cause the feedback circuit to modify the haptic actuator output in a direction toward a desired level, output and/or goal. In some examples, the feedback circuit is to modify the target input signal waveform to the haptic actuator until an equilibrium point is reached while reducing a difference between the output haptic vibration and a measured haptic vibration. In some examples, the feedback circuit is to modify the target input signal waveform to the haptic actuator until reaching a desired target signal (e.g., in terms of amplitude) known to the haptic effect sensor.

The use of a haptic effect sensor, or a plurality of haptic effect sensors, in combination with a feedback circuit enables the haptic devices taught herein to dynamically respond to changes in use variables (e.g., a change in a position of and/or a change in an orientation of a haptic device relative to a user, physical activity of the user, etc.)

to automatically alter a relationship between a haptic device and a user (e.g., via a position actuator or via an altered input signal waveform to the haptic actuator, etc.) or to facilitate a manual altering of a relationship between a haptic device and a user (e.g., providing a user with an instruction to adjust a fit of the haptic device, etc.) to enhance delivery of a desired haptic effect.

In some examples, the example haptic device uses an example haptic effect sensor (e.g., a 3-axis accelerometer, a piezo electric device, an electroactive polymer, etc.) near the example haptic actuator to sense and to provide feedback on the vibrations generated by the example haptic actuator. The example haptic effect sensor measurements are then used in a feedback loop to modify or tune the strength and/or frequency of the haptic effect generated by the example haptic actuator in real time. To illustrate, an example haptic device may be used to sense how tightly or loosely a user is wearing the haptic device and may further be used to guide the user to adjust the fit of the haptic device to provide haptic sensations to a desired fidelity.

FIG. 1 shows an example haptic device 100, in the form of wrist wear (e.g., a watch), disposed about a user's wrist 110. The example haptic device 100 includes an example band 120, an example housing 125 attached to the example band 120, an example indicator 130, an example battery 140 borne in the example housing 125, an example feedback circuit 145 and an example processor 150. Disposed in, or on, the example band 120 is one or more example haptic actuators 160 controllable to produce one or more output haptic vibrations 165. An example haptic effect sensor 170 is disposed in proximity to the example haptic actuator 160 to sense the output haptic vibration (output haptic vibration) 165 from the example haptic actuator 160. In some examples, the output haptic vibration 165 is a pre-set or a user-set output haptic vibration corresponding to a specific event (e.g., a text message, a phone call, an alarm, etc.) to convey to the user, via the haptic effect corresponding to the output haptic vibration 165, the occurrence of the specific event. In some examples, a plurality of different pre-set and/or user-set output haptic vibrations 165 are used to denote a plurality of distinct events.

In the example of FIG. 1, the example band 120, the example housing 125, the example indicator 130 and the example battery 140 are conventional and are not discussed herein in detail. The example indicator 130 is to visually present information, such as through the use of lights, images, text, audio content and/or video content. The example indicator 130 may include, for example, a light-emitting diode (LED) display, an organic light-emitting diode (OLED) display, a flexible OLED display, a thin-film transistor (TFT) display, a liquid crystal display (LCD), one or more discrete LEDs of one or more colors, or a speaker. In some examples, the example haptic device 100 includes user input devices, such as a button, a touch button, a touch pad, or a touch-screen, to receive inputs from a user. In some examples, the user input devices are integrated with the example indicator(s) 130. The example battery 140 includes, in some examples, a rechargeable battery, a watch battery (e.g., a silver-oxide battery, a silver-zinc battery, etc.), a lithium ion (Li-ion) battery, a bendable Li-ion battery, or a lithium polymer (LiPo) battery.

In some examples, the example haptic device 100 is a wearable haptic device such as, but not limited to, a garment, footwear, headwear, eyewear (e.g., glasses, goggles, etc.), wrist wear, a watch, a vest, a band, a therapeutic device (e.g., a wearable drug delivery or infusion device, a wearable monitoring device, a wearable respiratory therapy device, etc.), an orthotic device (e.g., an upper-limb orthoses, a lower-limb orthoses, etc.), a medical device (e.g., a biosensor, pulse oximeter, etc.) or a soft exosuit (e.g., a wearable robotic device).

In some examples, a robot or a robotic device includes an example haptic device 100, such as including the example haptic device 100 in a robotic end effector (e.g., a robotic hand, finger, fingertip, gripper, etc.) driven by one or more robotic end effector actuators. The example haptic device 100 (e.g., a haptic actuator and a haptic effect sensor, etc.), disposed in at least a portion of the robotic end effector, can be used to provide feedback (e.g., output signals) to a controller for the one or more robotic end effector actuators to alter an output of the actuators responsive to the sensed vibrations (e.g., a firmness of a grip of the robotic end effector on a workpiece or object held thereby is correlated to a level of vibration sensed by one or more haptic effect sensors of the haptic device, etc.).

Selection of a type and a location of the example indicator 130 and the example battery 140 are within the ordinary skill of one in the art and are adaptable to suit an application and form factor for a particular haptic device 100. In still other examples, the example haptic device 100 is a handheld electronic device. In some examples, the example haptic device 100 is a wearable device, such as a virtual reality device or an augmented reality device.

The example feedback circuit 145 is to modify a target input signal waveform to the example haptic actuator 160 to alter an output haptic vibration of the example haptic actuator 160 to reduce a difference between the output haptic vibration and a measured haptic vibration. In some examples, the example feedback circuit 145 is to modify a target input signal waveform to the example haptic actuator 160 to reduce a difference between the output haptic vibration and the measured haptic vibration, such as to reduce a difference between an amplitude and/or a frequency between the output haptic vibration and the measured haptic vibration. This difference between the output haptic vibration and a measured haptic vibration may include, for example, a difference in root-mean-square (RMS) levels, a difference in impulsiveness of vibration (e.g., a difference between peak levels and RMS levels), a difference in acceleration, a difference in a velocity, a difference in a displacement, a difference in symmetry, or a presence or an absence of some specified frequencies. To illustrate, in some examples, a threshold difference between a measured haptic vibration and an output haptic vibration is selectable, via the example feedback circuit 145, to reflect one or more desired states for a particular application of the example haptic device 100. For instance, an example haptic device 100 includes a first state (e.g., a default tight fit) where the haptic actuator 160 firmly contacts the user, a second state (e.g., a loose fit) where the haptic actuator 160 loosely or intermittently contacts the user, and a third state (e.g., a poor fit, a state of removal, etc.) where the haptic actuator 160 is not in contact with the user.

In some examples, the example feedback circuit 145 is empirically calibrated to correspond to a particular example haptic actuator 160 and/or use and/or a user. To empirically calibrate the example feedback circuit 145, the example haptic actuator 160 is placed in the first state (e.g., a default tight fit) and the haptic vibration sensed by the example haptic effect sensor 170 is set to correspond to the first state of the example haptic device 100. In some examples, the example haptic actuator 160 is placed in a variety of different positions corresponding to the first state to obtain a plurality of measured haptic vibrations corresponding to the first state. The example haptic actuator 160 is placed in the second state (e.g., a loose fit) and the measured haptic vibration sensed by the example haptic effect sensor 170 is set to correspond to a second state of the example haptic device 100. In some examples, the example haptic actuator 160 is placed in a variety of different positions corresponding to the second state to obtain a plurality of measured haptic vibrations corresponding to the second state. The example haptic actuator 160 in placed in the third state (e.g., a poor fit, a state of removal, etc.) and the measured haptic vibration sensed by the example haptic effect sensor 170 is set to correspond to the third state of the example haptic device 100. In some examples, a variety of different positions corresponding to the third state are used to obtain a plurality of measured haptic vibrations corresponding to the third state. In some examples, the above calibration is performed for a single output haptic vibration. In some examples, the above calibration is performed for a plurality of output haptic vibrations. The empirical approach to calibration is one example by which the example haptic actuator 160 is tuned to obtain a desired effect for one or more output haptic vibrations.

In some examples, the example feedback circuit 145 includes the example processor 150 to control the example haptic actuator 160 to output a selected output haptic vibration or a selected one of a plurality of available output haptic vibrations. The processor 150 of the illustrated example can be implemented by, for example, one or more integrated circuits, logic circuits, microprocessors or controllers from any desired family or manufacturer.

Disposed in, or on, the example band 120 of the example haptic device 100 of FIG. 1 is an example haptic actuator 160. In some examples, the example haptic actuator 160 is a mechanical vibrator such as a piezoelectric device (e.g., a piezoelectric film, a single-layer disc, a multilayer strip, etc.) or an electroactive polymer (EAP). In some examples, the example haptic actuator 160 includes an eccentric rotating mass (ERM), linear resonant actuator (LRA), and/or another transducer or vibrator to create a haptic sensation. In some examples, the example haptic actuator 160 is driven by a haptic driver (e.g., piezo haptic driver, motor haptic driver, etc.) which may include a library of haptic actuator 160 output haptic vibrations 165 corresponding to different haptic effects. In some examples, the output haptic vibration 165 is a pre-set output haptic vibration or a user-set output haptic vibration corresponding to a specific event (e.g., a text message, a phone call, an alarm, etc.) to convey to the user the occurrence of the specific event via the output haptic vibration and corresponding haptic effect. During testing of an example haptic device 100, discussed below, a Jinlong C1020B217F coin vibration motor, manufactured by Jinlong Machinery & Electronics, Co. Ltd. Of Zhejiang Province, China, was used as an example haptic actuator 170.

In the example haptic device 100 of FIG. 1, an example haptic effect sensor 170 is disposed in proximity to the example haptic actuator 160 to sense the output haptic vibration 165 from the example haptic actuator 160. The haptic vibration sensed by the example haptic effect sensor 170 provides feedback (e.g., waveforms, amplitude, frequency, etc.) to the example feedback circuit 145, which determines a difference between the output haptic vibration produced by the example haptic actuator 160 and the haptic vibration sensed by the example haptic effect sensor 170. In some examples, the example haptic effect sensor 170 includes a load cell, an infrared sensor, an optical sensor, a capacitive sensor, an accelerometer, a temperature sensor, a piezoelectric device, a strain gauge, a gyroscope, an electroactive polymer, and/or another transducer to sense or measure a displacement, a force and/or an acceleration. As noted above, the example haptic effect sensor 170 is to sense a haptic vibration corresponding to the haptic actuator 160 output haptic vibration 165. In some examples, the example haptic effect sensor 170 is to sense or measure an amplitude and a frequency of a haptic vibration corresponding to the output haptic vibration 165. During testing of an example haptic device 100, discussed below, an InvenSense MPU9150 accelerometer, manufactured by InvenSense Inc. of San Jose, Calif., was used as an example haptic effect sensor 170. In another example, an example haptic effect sensor 170 includes an InvenSense MPU9250 accelerometer.

A spacing between the example haptic effect sensor 170 and the example haptic actuator 160 may include any distance (e.g., contiguous, adjacent, etc.) over which a measured haptic vibration sensed by the example haptic effect sensor 170 includes actionable data indicative of a performance of the example haptic actuator 160. In some examples, this distance may vary as between different example haptic devices 100 (e.g., a watch, a garment, etc.) and/or similar example haptic devices 100 in similar applications (e.g., a dress watch, a sport watch, etc.). To illustrate, a spacing between an example haptic effect sensor 170 and an example haptic actuator 160 in a watch may differ from a spacing between an example haptic effect sensor 170 and an example haptic actuator 160 in a garment. In some examples, the example haptic device 100 includes another sensor, such as a biometric sensor, a biosensor, a temperature sensor, a pressure sensor, a heart rate sensor or a cardiac electrical potential waveform sensor. In some examples, the example haptic effect sensor 170 and feedback circuit 145 are implemented to facilitate proper positioning of such sensor relative to the user (e.g., to ensure a heart rate sensor is properly positioned, etc.).

In some examples, a number of example haptic actuators 160 is different than a number of example sensors 170. For example, an example haptic actuator 160 may have two example sensors 170 disposed in proximity to the example haptic actuator 160 (e.g., on opposite sides of the example haptic actuator 160, etc.) to sense the output haptic vibration 165 from the example haptic actuator 160. As another example, two example haptic actuators 160 are disposed in proximity to an example haptic effect sensor 170 (e.g., on opposite sides of the example haptic effect sensor 170, etc.) positioned to receive haptic vibrations corresponding to the respective output haptic vibrations 165 from each of the example haptic actuators 160. In general, the example haptic device 100 may include one or more example haptic actuators 160 of one or more types and one or more example sensors 170 of one or more types.

In some examples, the example haptic device 100 includes a haptic effect sensor (e.g., the haptic effect sensor 170 including at least one of a load cell, an infrared sensor, an optical sensor, a capacitive sensor, an accelerometer, a piezoelectric sensor, a strain gauge, or a transducer to sense or measure at least one of displacement, force or acceleration) and a second sensor, which may be a haptic effect sensor or another type of sensor (e.g., a biometric sensor, a biosensor, a temperature sensor, a pressure sensor, a heart rate sensor or a cardiac electrical potential waveform sensor) and an example indicator 130 is to generate a guide signal or instruction, based on a difference between the output haptic vibration 165 and a haptic vibration sensed or measured by haptic effect sensor 170, to guide a user to modify a position of the second sensor.

In some examples, the example haptic device 100 is a wearable haptic device and includes a first haptic actuator 160 disposed on a first portion of the haptic device, a first haptic effect sensor 170 disposed adjacent to the first haptic actuator 160, a second haptic actuator 160 disposed on a second portion of the haptic device and a second haptic effect sensor 170 disposed adjacent to the second haptic actuator 160. In some examples, the example feedback circuit 145 is to modify a target input signal waveform to the second haptic actuator 160 based on a difference between a second output haptic vibration 165 and a haptic vibration sensed by the first haptic effect sensor and/or the second haptic effect sensor 170.

Figure 2:
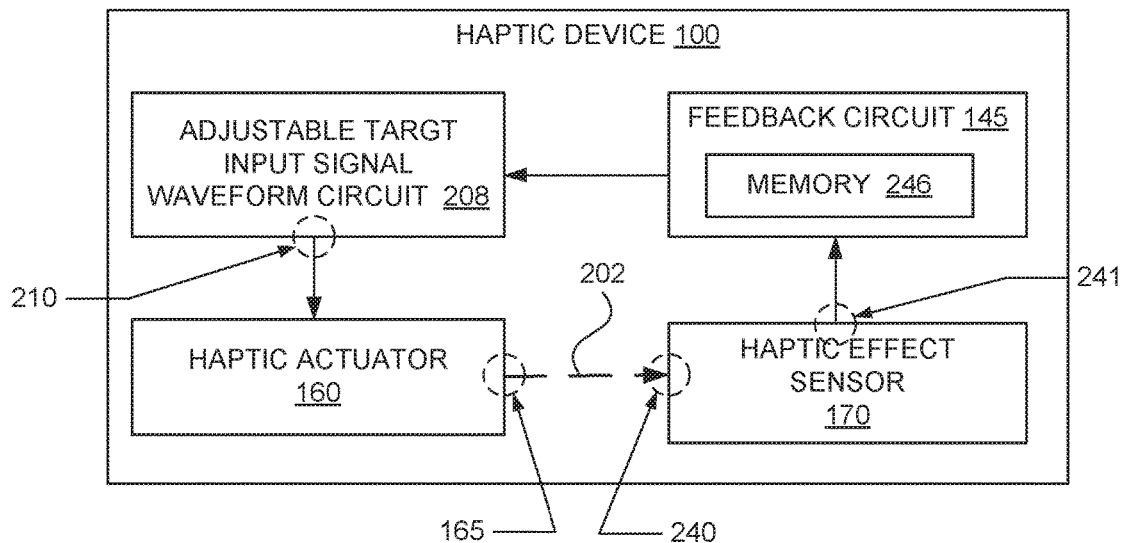
FIG. 2 is a block diagram of an example implementation of a haptic device.

FIG. 2 is a block diagram of an example haptic device 100 in which an adjustable input signal waveform circuit 208 provides a target (e.g., desired) input signal waveform 210 waveform to an example haptic actuator 160, which generates an output haptic vibration 165 responsive to the target input signal waveform 210. The target input signal waveform 210 may include any desired waveform (e.g., sine wave, square wave, triangle wave, sawtooth wave, etc.), wavelet or wave packet, of any type, to generate a desired output haptic vibration 165 from the example haptic actuator 160. The target input signal waveform 210 may be empirically determined. The output haptic vibration 165 is conveyed, along an example path 202, through a substrate material in which, or on which, the example haptic actuator 160 and example haptic effect sensor 170 are disposed. A measured haptic vibration 240 may differ from the output haptic vibration 165 due to, for example, a modification of the output haptic vibration 165 (e.g., an attenuation of one or more characteristics of the vibration such as amplitude, frequency, phase, wavelength, etc.) in a substrate material in which or on which the example haptic actuator 160 and example haptic effect sensor 170 are disposed. The measured haptic vibration 240 may differ from the output haptic vibration 165 due to, for example, a modification of the output haptic vibration 165 by a material or constraint imposing an boundary condition external to the example haptic device 100 such as, for example, a fit of a wearable haptic device 100 to a user.

The haptic effect sensor 170 outputs to the feedback circuit 145 a measured haptic vibration waveform 241. The example feedback circuit 145 of FIG. 2 includes a memory 246 (e.g., a lookup table (LUX), etc.) including waveform information to which the measured haptic vibration waveform 241, or derivatives thereof, can be compared. In some examples, the memory 246 includes a library of input signal waveforms, or portions thereof, corresponding to a plurality of haptic effects to be output by the haptic actuator 160. In some examples, the memory 246 includes user-stored measured haptic vibration waveforms 241 or portions thereof (e.g., acceptable measured haptic vibration waveforms 241 and unacceptable measured haptic vibration waveforms 241, etc.). In some examples, the example feedback circuit 145, responsive to a difference between the target input signal waveform 210 and the measured haptic vibration waveform 241, which corresponds to a difference between an output haptic vibration 165 and a measured haptic vibration 240 from the haptic effect sensor 170, outputs an instruction to an adjustable input signal waveform circuit 208 to modify a target input signal waveform 210 provided to the example haptic actuator 160 to change an output haptic vibration 165 generated by the example haptic actuator 160. In some examples, the change to the output haptic vibration 165, via the modification of a target input signal waveform 210 to the example haptic actuator 160, may include a change to an amplitude, frequency, phase and/or wavelengths of the output haptic vibration 165, or a change of the output haptic vibration 165 from a first vibration to a second vibration. In some examples, the modification(s) to the target input signal waveform 210 are empirically determined.

Figure 3:
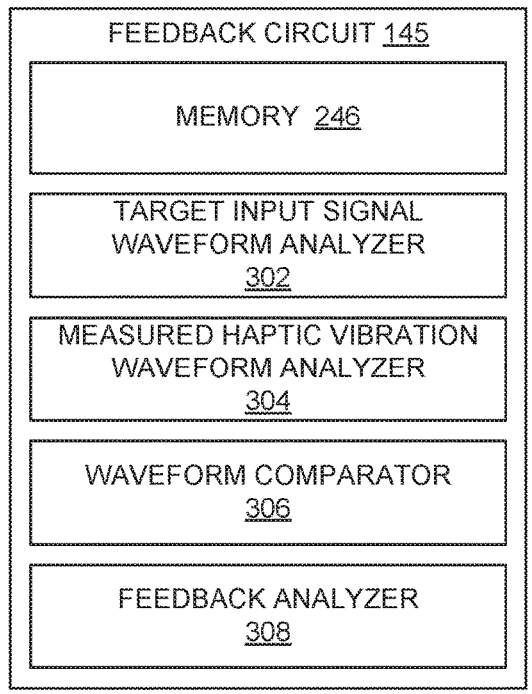
FIG. 3 is a block diagram of an example implementation of a feedback circuit.

FIG. 3 is a block diagram of an example feedback circuit 145. The example feedback circuit 145 includes an example memory 246, an example target input signal waveform analyzer 302, an example measured haptic vibration waveform analyzer 304, an example waveform comparator 306, and an example feedback analyzer 308. In some examples, the example target input signal waveform analyzer 302, the example measured haptic vibration waveform analyzer 304, the example waveform comparator 306, and the example feedback analyzer 308 are operatively associated with one or more processors 150.

Each of the example target input signal waveform analyzer 302 and the example measured haptic vibration waveform analyzer 304 are to prepare the respective one of the target input signal waveform 210 and the measured haptic vibration waveform 241 for comparison by the example waveform comparator 306. In some examples, the example target input signal waveform analyzer 302 and/or the example measured haptic vibration waveform analyzer 304 apply scaling, offset, gain, biasing or other conversions, as needed, to enable direct comparisons between target input signal waveform 210 and the measured haptic vibration waveform 241. The example target input signal waveform analyzer 302 resolves the target input signal waveform 210 into a form suitable for comparison to the measured haptic vibration waveform 241 (e.g., converting the target input signal waveform 210 from a time domain into a frequency domain via a transform (e.g., a Fast Fourier Transform, a wavelet transform, etc.)). The example measured haptic vibration waveform analyzer 304 resolves the measured haptic vibration waveform 241 into a form suitable for comparison to the target input signal waveform 210 (e.g., converting the measured haptic vibration waveform 241 from a time domain into a frequency domain via a transform (e.g., a Fast Fourier Transform, a wavelet transform, etc.)).

The example waveform comparator 306 applies conventional waveform analysis techniques (e.g., frequency-domain analysis, analysis of spectral components, etc.) to the target input signal waveform 210 and the measured haptic vibration waveform 241 to identify differences between the waveforms. The example waveform comparator 306 then compares the identified differences between the target input signal waveform 210 and the measured haptic vibration waveform 241 to pre-determined thresholds, such as a lookup table of threshold values set during a calibration of the example haptic device 100 and stored in memory 246, to determine whether a measured haptic vibration 240 sensed by the example haptic effect sensor 170 is indicative of a physical state of the example haptic device 100 for which an adjustment may be beneficial. For example, during a calibration of the example haptic device 100 by a user during a device training session, the user positions the example haptic device 100 in one or more acceptable positions for the example haptic device 100 (i.e., one or more positions at which the user receives a desired haptic effect for a given output haptic vibration 165) and one or more unacceptable positions for the example haptic device 100 (i.e., one or more positions at which the user does not receive a desired haptic effect for a given output haptic vibration 165). The output haptic vibrations 165 and measured haptic vibrations 240 corresponding to these acceptable and unacceptable positions are resolved into representative waveforms, via a transform, and the representative waveforms (e.g., a mapping between the target input signal waveform 210 and the measured haptic vibration waveforms 241 for a variety of positions of the haptic device 100, etc.), or data derived therefrom or relating thereto (e.g., one or more specific frequencies, one or more specific amplitudes, etc.), are stored in a physical memory device 246 data structure (e.g., a lookup table) as representative normal and off-normal waveforms or derivatives thereof (e.g., an amplitude, a frequency, etc.). In another example, the example haptic device 100 includes a factory-setting lookup table having waveforms, or data derived therefrom or relating thereto, corresponding to acceptable and unacceptable positions and related haptic effects determined during product development.

The example feedback analyzer 308 determines a corrective action to apply to the example haptic device 100 responsive to any identified off-normal waveform, or derivative thereof. In some examples, the corrective actions are included in a lookup table of corrective actions set during a calibration of the example haptic device 100. For example, during a calibration of the example haptic device 100 by a user during a device training session, the user inputs one or more desired corrective actions for one or more positions of the example haptic device 100 that provide to the user an unacceptable haptic effect. To illustrate, for a specific output haptic vibration 165, a user may define a first corrective action for a first threshold difference in waveforms output by the example waveform comparator 306 representing a first off-normal condition, a second corrective action for a second threshold difference in waveforms output by the example waveform comparator 306 representing a second off-normal condition, and a third corrective action for a third threshold difference in waveforms output by the example waveform comparator 306 representing a third off-normal condition. In some examples, the first corrective action includes an output to one or more indicators 130 (e.g., a lighted LED indicator, a tone output from a speaker, etc.) to alert a user to the first threshold difference, the second corrective action includes an output to a plurality of indicators 130 (e.g., an instruction for resolving the second threshold different displayed on a display device and a tone output from a speaker, etc.) to alert a user to the second threshold difference, and the third corrective action including a modification of an output of the example haptic actuator 160 (e.g., a modification of a frequency of the output haptic vibration, a modification of an amplitude or intensity of the output haptic vibration, use of a different output haptic vibration, etc.) via an output signal to the adjustable input signal waveform circuit 208. In some examples, a response by the example feedback analyzer 308 to modify a parameter, or to prompt a modification of a parameter, to the example haptic device 100 is empirically determined.

When a time-varying haptic effect is to be produced (e.g., a sinusoidal effect, etc.) the example haptic effect sensor 170 output (e.g., measured haptic vibration 240 time domain signal, etc.) to the example measured haptic vibration waveform analyzer 304 can be sampled and transformed, via the example waveform comparator 306, in accordance with an instantaneous haptic amplitude to be produced. Thus, a dynamic haptic effect can be detected by the example waveform comparator 306 and adjusted in real time via the example feedback analyzer 308.

Figure 4A:
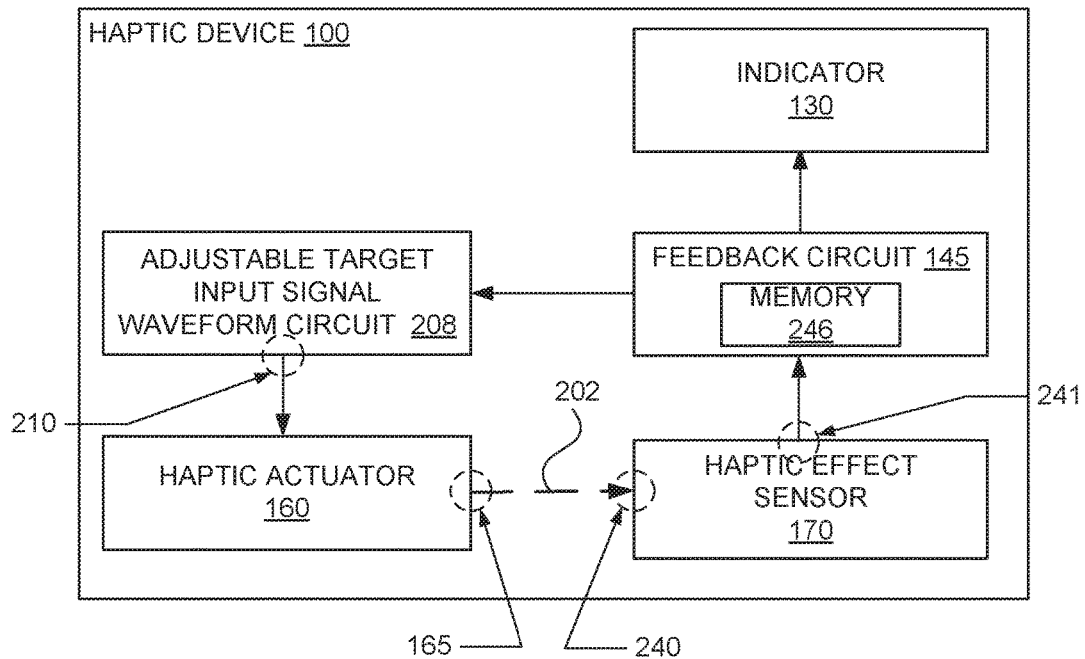
FIGS. 4A-4B are block diagrams of still other example implementations of haptic devices.
Figure 4B:
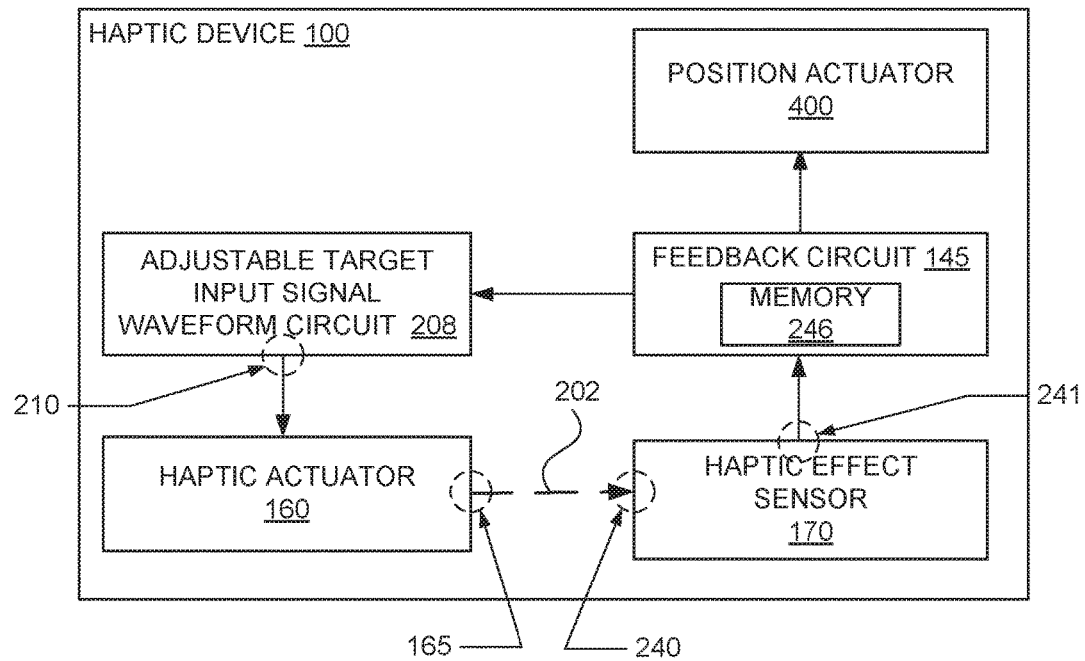

FIGS. 4A-4B are block diagrams of other example haptic devices 100. FIG. 4A shows a variant of the examples of FIGS. 2-3 wherein the example feedback circuit 145 is to output a signal to an example indicator 130 to convey to a user lights, images, text, audio content and/or video content representative of a difference between the output haptic vibration 165 and the measured haptic vibration 240. To illustrate, if the example feedback circuit 145 determines a difference exists between the target input signal waveform 210 and the measured haptic vibration waveform 241 and that such difference correlates to an unacceptable configuration of an example haptic device 100 (e.g., the aforementioned third state of a haptic device 100, etc.), a signal is output to the example indicator 130 to prompt a user to undertake a corrective action to reconfigure the example haptic device 100 to an acceptable configuration. As an example, if a wearable haptic device 100, such as is shown in FIG. 1, is in a loose state correlating to an unacceptable configuration (e.g., set by a user during an empirical "training" operation, etc.), the example feedback circuit 145 causes the example indicator 130 to output an audible alert through a speaker (e.g., leftmost example indicator 130 in FIG. 1) of the wearable haptic device 100 and/or to output a visual alert to the example display (e.g., rightmost example indicator 130 in FIG. 1) of the wearable haptic device 100. In some examples, the visual alert may include specific instructions to a user corresponding to a particular difference indicated by the example feedback circuit 145. In some examples, different audible alerts may be used to convey different degrees or difference indicated by the example feedback circuit 145.

FIG. 4B shows an example feedback circuit 145 outputting a control signal representative of the difference between the target input signal waveform 210 and the measured haptic vibration waveform 241 determined by the example feedback circuit 145 to an example position actuator 400 to cause the position actuator 400 to move a first portion of the example haptic device 100 (e.g., a wearable haptic device, etc.) from a first position to a second position. For example, the position actuator 400 is to move a first portion of a wearable haptic device to modify a fit of the wearable haptic device. In some examples, the example position actuator 400 includes a mechanical actuator, an electric actuator, a pneumatic actuator, or a hydraulic actuator disposed to connect two portions of the example haptic device 100 and to move the two portions of the example haptic device 100 relative to one another. In some examples, the example position actuator 400 is a linear actuator, a micro linear actuator, a rotary actuator, a voice coil actuator, or an ultrasonic piezo actuator, artificial muscle, pneumatic artificial muscle, or electro-active polymer. If the example feedback circuit 145 detects a difference between the target input signal waveform 210 and the measured haptic vibration waveform 241 corresponding to an unacceptable configuration of an example haptic device 100 (e.g., the aforementioned third state of a haptic device 100 wherein the haptic device has a poor fit resulting in a measured haptic vibration 240 that does not favorably compare to the output haptic vibration 165, etc.), the example feedback circuit 145 outputs a signal to the example position actuator 400 to actuate the example position actuator 400 and cause a first portion of the example haptic device 100 to move relative to (e.g., closer to, further from, etc.) a second portion of the example haptic device 100. This movement of the first portion of the example haptic device 100 relative to the second portion of the example haptic device 100 causes a corresponding change in a position of the example haptic device 100, such as a change in a fit of a wearable haptic device 100 (e.g., a tightening of a loose band 120, etc.).

Figure 5:
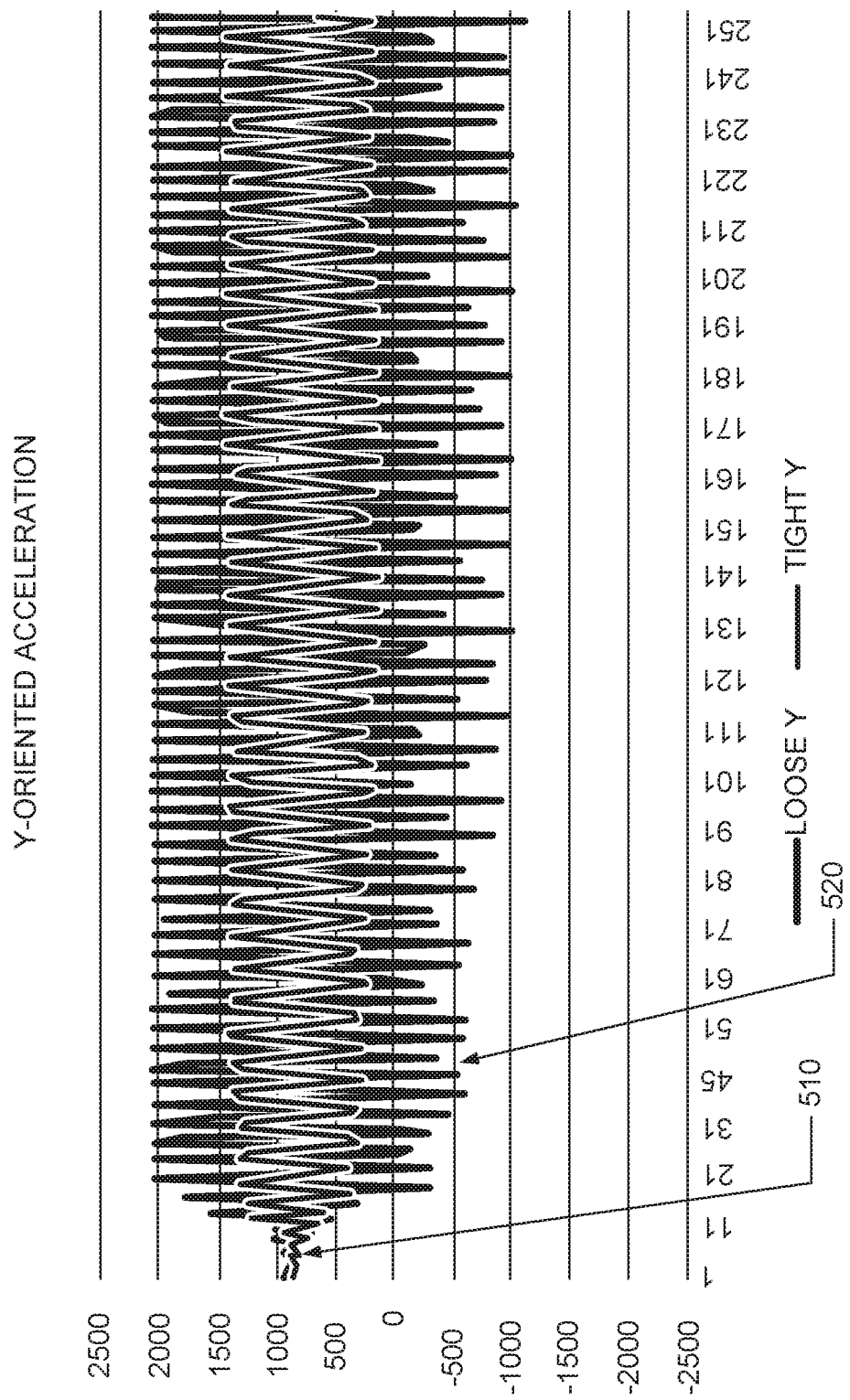
FIG. 5 presents plots for the example haptic device of FIG. 1, showing accelerations along a first axis measured by an example haptic effect sensor for a first state (loose) and a second state (tight).
Figure 6:
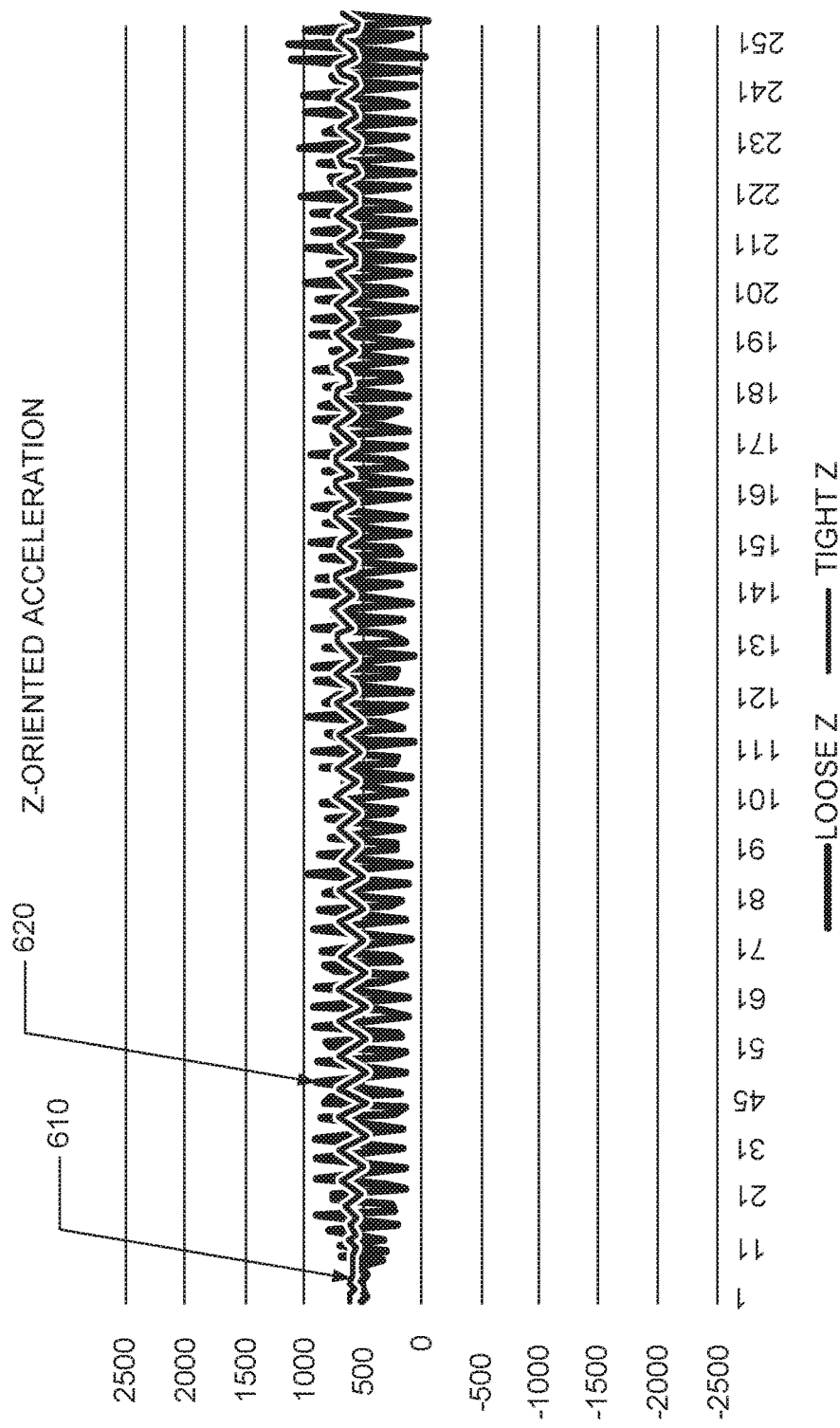
FIG. 6 presents plots for the example haptic device of FIG. 1, showing accelerations along a second axis measured by an example haptic effect sensor for a first state (loose) and a second state (tight).

FIG. 5 presents plots 510, 520 for an example wrist-worn haptic device 100 similar to that of FIG. 1, with plot 510 showing accelerations measured by an example haptic effect sensor 170 along a first axis (i.e., Y-axis) for a first state (tight) and plot 520 showing accelerations measured by the example haptic effect sensor 170 along the first axis (i.e., Y-axis) for a second state (loose). FIG. 6 presents plots 610, 620 for the same example wrist-worn haptic device 100, with plot 610 showing accelerations along a second axis (i.e., Z-axis, FIG. 6) measured by the example haptic effect sensor 170 for a first state (loose) and plot 620 showing accelerations along the second axis measured by the example haptic effect sensor 170 for a second state (tight).

In the tested example wrist-worn device of FIGS. 5-6, example measured haptic vibrations 240 at the example haptic effect sensor 170, spaced apart from the haptic actuator 160 by about 2 mm, were observed to correlate to how loosely or tightly the wrist-worn device was being worn. As noted above, the example haptic effect sensor 170 for these tests was an InvenSense MPU9150. Plots 510-520 and 610-620 of FIGS. 5-6 show acceleration (in units of milli-g at a fixed sampling rate) measured by the example haptic effect sensor 170 for both a tightly worn and a loosely worn example wrist-worn haptic device 100. The measured haptic vibration represented as acceleration plots 510-520 and 610-620 show a reduction in amplitude and frequency for the tight band or, conversely, an increase in amplitude and frequency for the loose band. The differences in FIGS. 5-6 may indicate that more haptic energy is conveyed to the wrist when the wrist-worn haptic device 100 is tightly fastened about the user's wrist.

In FIG. 5, the amplitude of the Y-oriented acceleration for a tight fit of the example wrist-worn device, shown in plot 510, is between about +/−500 milli-g (Y-axis) about an origin of about 750 milli-g for the duration of the test, 251 milliseconds, shown along the X-axis. In contrast, the amplitude of the Y-oriented acceleration for a loose fit of the example wrist-worn device, shown in plot 520, is between about +/−1000 milli-g about an origin of about 750 milli-g.

In FIG. 6, the amplitude of the Z-oriented acceleration for a tight fit of the example wrist-worn device, shown in plot 610, is between about +/−50 milli-g about an origin of about 600 milli-g. In contrast, the amplitude of the Z-oriented acceleration for a loose fit of the example wrist-worn device, shown in plot 620, is between about +/−400 milli-g about an origin of about 600 milli-g.

These differences between the measured haptic vibrations 240 sensed at the example haptic effect sensor 170 (e.g., loose vs. tight) and a fixed output haptic vibration 165 from the example haptic actuator 160 are actionable and permit the example feedback circuit 145 to differentiate between different positions of the example haptic device 100. From the measured haptic vibrations 240 (e.g., plots 510-520 and/or 610-620), the example feedback circuit 145 outputs corresponding instructions and/or control signals to, for example, an example indicator 130, an example adjustable input signal waveform 210 or an example position actuator 400.

Figure 7:
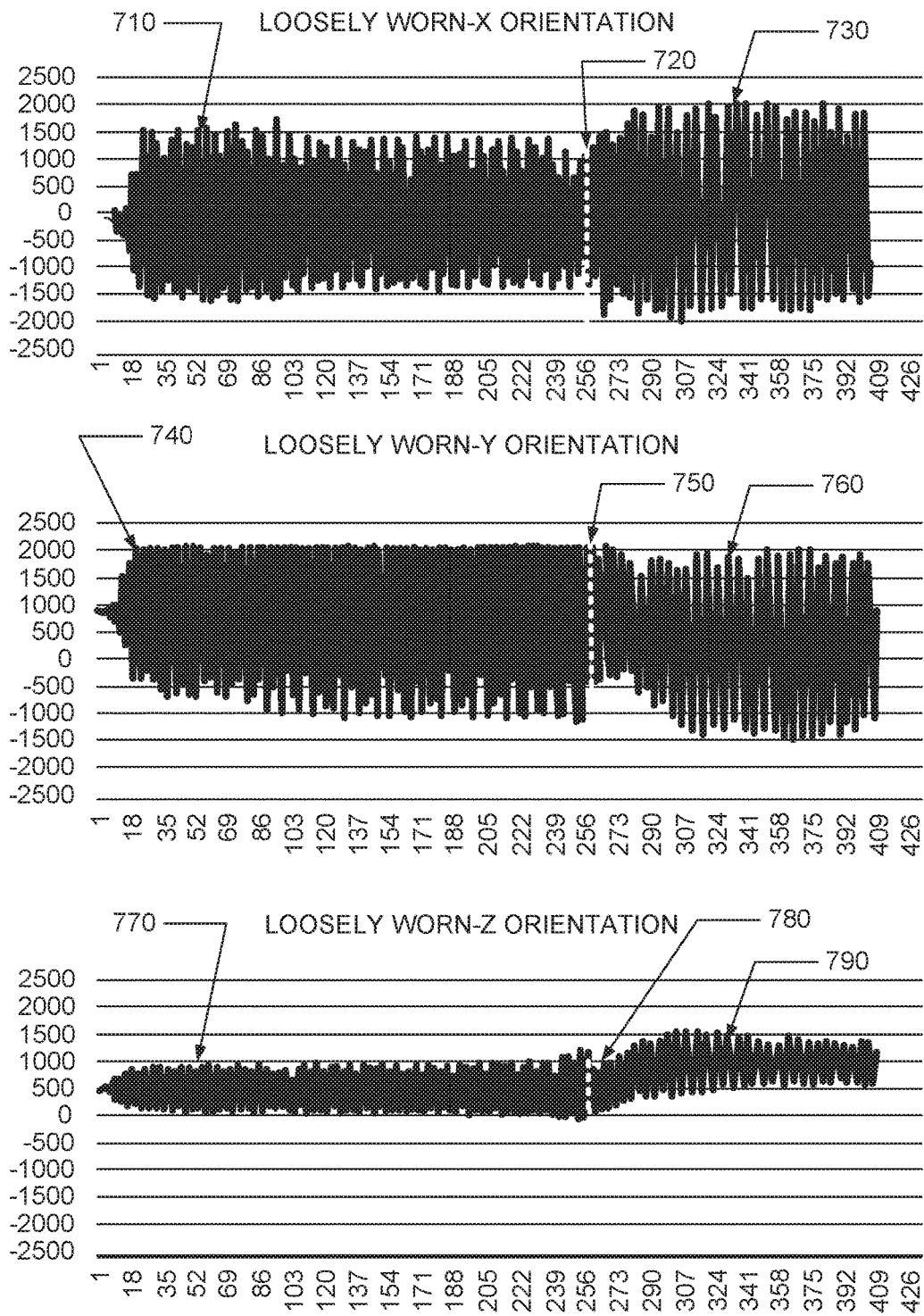
FIG. 7 presents plots for the example haptic device of FIG. 1, showing accelerations along a first axis, a second axis and a third axis, measured by an example haptic effect sensor for both a first state (loose) and a second state (tight), as well as a transition from the first state to the second state.

FIG. 7 presents plots for the example wrist-worn haptic device 100 similar to that shown in FIG. 1. Specifically, FIG. 7 shows accelerations along an X-axis (top plot), a Y-axis (middle plot) and a Z-axis (bottom plot), measured by an example haptic effect sensor 170 for a first state, loosely worn in a first orientation for a period from 0-256 milliseconds, and a second state, loosely worn in a second orientation for a period from 256-408 milliseconds. The transition from the first state to the second state, reflecting a change in an orientation of the example haptic device 100 relative to the user's wrist, is denoted by the transition 720 in the top plot, the transition 750 in the middle plot, and the transition 780 in the bottom plot. In the plot of accelerations along the X-axis (top plot of FIG. 7), characteristic amplitudes and frequencies of the accelerations in the first portion 710 of the plot prior to the transition 720 is different than characteristic amplitudes and frequencies of the accelerations in the second portion 730 of the plot following the transition 720.

Similarly, in the plot of accelerations along the Y-axis (middle plot of FIG. 7), characteristic amplitudes and frequencies of the accelerations in the first portion 740 of the plot prior to the transition 750 is different than characteristic amplitudes and frequencies of the accelerations in the second portion 760 of the plot following the transition 750. Further, in the plot of accelerations along the Z-axis (bottom plot of FIG. 7), characteristic amplitudes and frequencies of the accelerations in the first portion 770 of the plot prior to the transition 780 is different than characteristic amplitudes and frequencies of the accelerations in the second portion 790 of the plot following the transition 780. Further to the above-noted example comparisons between the measured haptic vibration 240 sensed at the example haptic effect sensor 170 and the output haptic vibration 165 of the example haptic actuator 160, FIG. 7 demonstrates that relative changes in a measured haptic vibration 240 sensed by the example haptic effect sensor 170 may themselves be used to cause the feedback circuit 145 to output instructions and/or control signals to, for example, an example indicator 130, an example adjustable input signal waveform 210 or an example position actuator 400 independent of the output haptic vibration 165 of the example haptic actuator 160.

Figure 8:
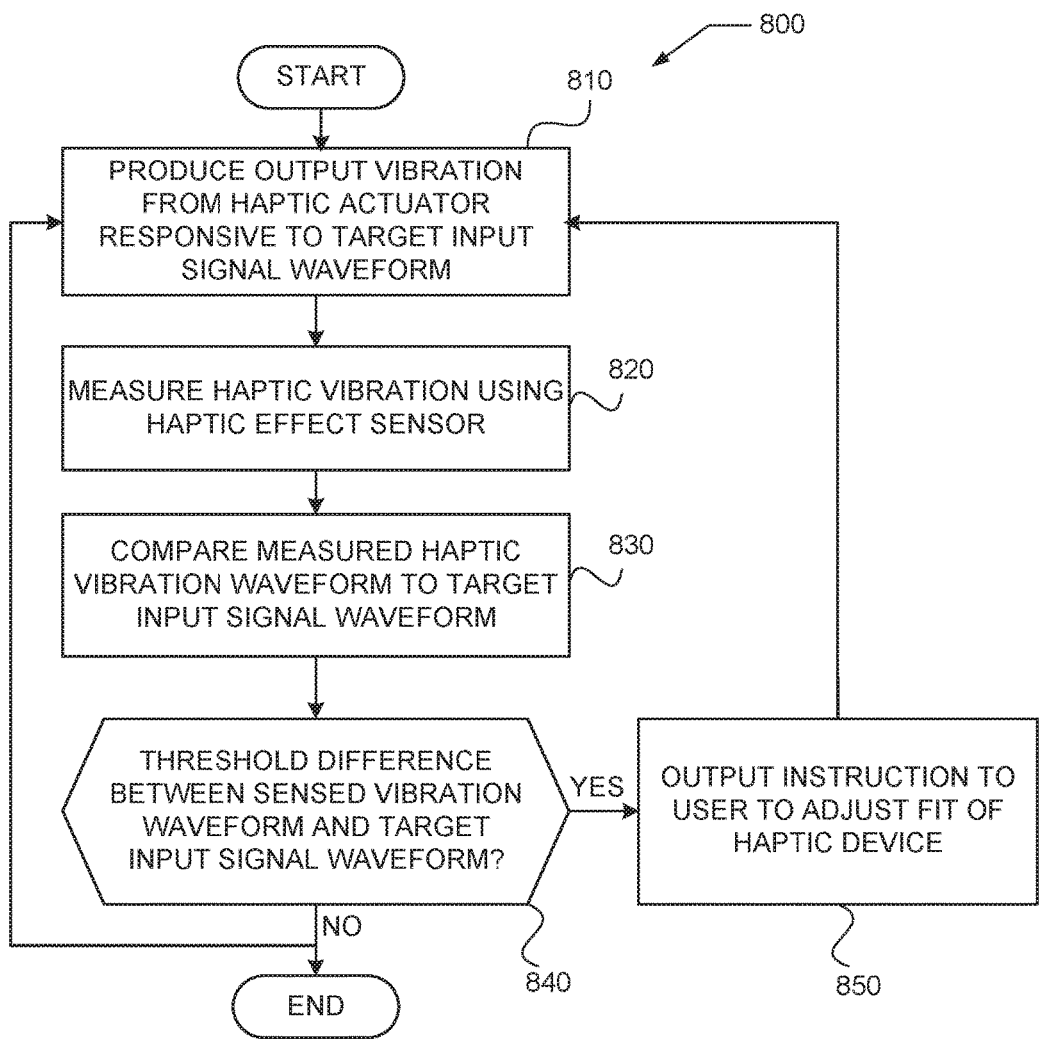
FIG. 8 is a flowchart representative of example machine readable instructions which may be executed to yield a manual adjustment to a haptic device.
Figure 9:
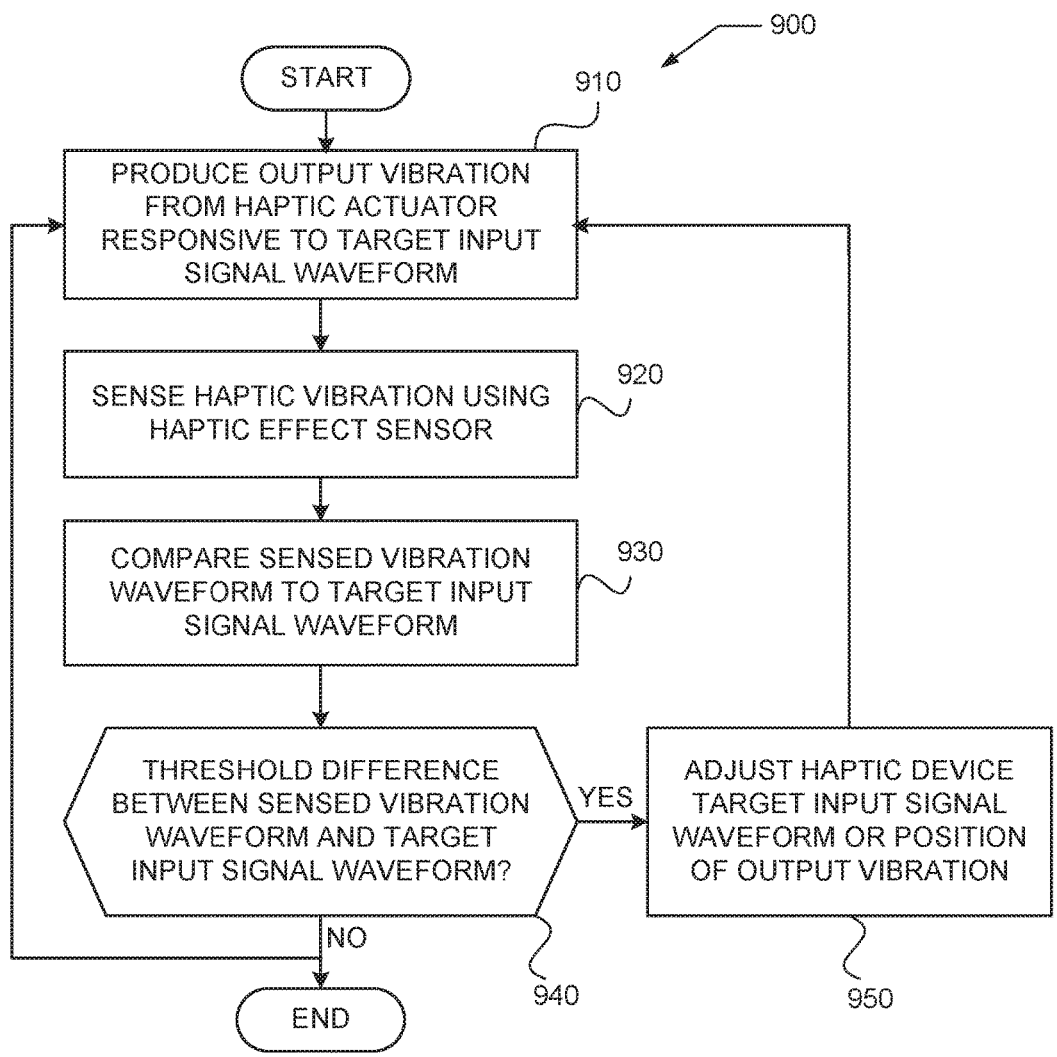
FIG. 9 is a flowchart representative of another example machine readable instructions which may be executed to yield an automated adjustment to a haptic device.

Flowcharts representative of example machine readable instructions for implementing adjustments to an example haptic device 100, such as is shown by way of example in FIGS. 1-4, are shown in FIGS. 8-9. In these examples of FIGS. 8-9, the machine readable instructions comprise a program for execution by a processor such as the processor 150 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 150 or the example processor platform 1000, but the entire program and/or parts thereof could alternatively be executed by a device other than the processor 150 and/or embodied in firmware or dedicated hardware. Further, although the example program is described with reference to the flowcharts illustrated in FIGS. 8-9, many other methods of implementing the example instructions for implementing adjustments to an example haptic device 100 may alternatively be used. For example, the order of execution of the blocks may be changed, and/or some of the blocks described may be changed, eliminated, or combined.

As mentioned above, the example processes of FIGS. 8-9 for implementing adjustments to an example haptic device 100, or other processes disclosed herein, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-9 for implementing adjustments to an example haptic device 100, or other processes disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 shows a flowchart representative of example machine readable instructions which may be executed to yield a manual adjustment to a haptic device. In block 810, an output haptic vibration 165 is produced by a haptic actuator 160 responsive to a target input signal waveform 210 (see FIG. 2) for a desired or target haptic vibration generated by an adjustable input signal waveform circuit 208. The target input signal waveform 210 may include any desired waveform, wavelet or packet without limitation (e.g., a sine wave, a square wave, a triangle wave, a sawtooth wave, etc.). In some examples, block 810 includes storing a waveform, or a derivative thereof, in a physical memory 246, the waveforms or derivatives thereof corresponding to desired output haptic vibrations 165 (e.g., haptic effects) to be produced by the haptic actuator 160 in response to the target input signal waveform 210. For example, an output haptic vibration 165 is produced by an eccentric rotating mass (ERM) actuator responsive to a target input signal waveform (e.g., an applied voltage).

In block 820, a haptic vibration 240 is measured by an example haptic effect sensor 170 located in proximity to the example haptic actuator 160, such as is shown in FIGS. 2-3 and 4A-4B. To illustrate, an example haptic effect sensor 170 including an accelerometer is used to sense a haptic vibration having an amplitude and a frequency relating to an amplitude and a frequency of the output haptic vibrations 165. In some examples, block 820 includes storing in a physical memory 246 a waveform, or a derivative thereof, corresponding to the measured haptic vibration 240, or a portion thereof, sensed by the example haptic effect sensor 170.

In block 830, a measured haptic vibration waveform 241 corresponding to the measured haptic vibration 240 is compared to the target input signal waveform 210. For instance, as shown in the example of FIG. 2, the measured haptic vibration waveform 241 is output by a haptic effect sensor 170 to a feedback circuit 145, where it can then be compared to the target input signal waveform 210 retrieved from the memory 246. In some examples, this comparison of the measured haptic vibration waveform 241 to the target input signal waveform 210 to the haptic actuator 160 includes a comparison between an amplitude and/or a frequency of the target input signal waveform 210 and an amplitude and/or a frequency of the measured haptic vibration waveform 241.

This comparison of the measured haptic vibration waveform 241 to the target input signal waveform 210 may include any conventional technique for comparing waveforms or signals including, but not limited to a comparison in root-mean-square (RMS) levels, a comparison between impulsiveness of vibration (e.g., a difference between peak levels and RMS levels), a comparison between accelerations, a comparison between velocities, or a comparison between displacements, or a comparison of symmetry. In some examples, a conversion of a measured haptic vibration 240 to a measured haptic vibration waveform 241 for purposes of comparison to the target input signal waveform 210 may include a conversion of the measured haptic vibration 240 to a frequency domain using a transform, for example, to identify a range of sensed frequencies or to identify a dominant frequency within this range of sensed frequencies. Comparison between the target input signal waveform 210 causing the output haptic vibration 165 and the measured haptic vibration waveform 241 corresponding to the measured haptic vibration 240, or comparison of a first portion of the measured haptic vibration waveform 241 to a second portion of the measured haptic vibration waveform 241, may use any conventional techniques for vibration, waveform, signal or function analysis. In some examples, this transform may include a Fourier transform (e.g., fast Fourier transform (FFT), indirect Fourier transform, Fourier sine transform, fractional Fourier transform, etc.) or a wavelet transform (e.g., continuous wavelet transform, discrete wavelet transform, complex wavelet transform, etc.).

Following comparison of the measured haptic vibration waveform 241 and the target input signal waveform 210 in block 830, block 840 determines if a threshold difference exists between the measured haptic vibration waveform 241 and the target input signal waveform 210. If "YES," an instruction is output to a user of the example haptic device 100 in block 850 instructing the user to adjust a fit of the example haptic device 100. A value of the comparison may further inform the instruction to be output to the user. By way of example, a direction of adjustment of a fit of the example haptic device (e.g., to tighten, to loosen, etc.) may be indicated by a direction of a difference (e.g., negative, positive). If no threshold difference exists (block 840="NO") between the measured haptic vibration waveform 241 and the target input signal waveform 210 in block 840, control passes back to block 810.

In some examples, a complexity of the instruction varies in accord with a type of indicator 130 (e.g., LED, display device, speaker, etc.) selected to provide feedback to the user and may include an illumination of a light (e.g., continuous, pulsing, etc.), a generator of an audible tone, alert, or message from a speaker, and/or a textual instruction displayed on a display device. For example, if the haptic device 100 is a watch, shown in FIG. 1, and the watch is loose, the indicator 130 (e.g., display device), may display a prompt instructing a user to tighten the watch to improve a fidelity of a desired haptic effect. Thus, if a measured haptic vibration waveform 241 corresponding to a measured haptic vibration 240 indicates that the example haptic device 100 is worn too loosely, the user may be guided to tighten the example haptic device 100 and, conversely, if a measured haptic vibration waveform 241 corresponding to a measured haptic vibration 240 indicates the example haptic device 100 is worn too tightly, the user may be guided to loosen the example haptic device 100. In another example, when the user is donning a wearable haptic device 100 or, during wear of the wearable haptic device 100, the feedback circuit 145 is to guide the user (e.g., via guide signals or instructions output from an indicator 130, such as a display device or speaker, etc.) to adjust a tightness of one or more components of the wearable haptic device 100 to position the wearable haptic device to deliver a desired haptic effect from one or more haptic actuators 160.

In some examples, the example feedback circuit 145 determines, from the measured haptic vibration waveform 241, whether the measured haptic vibration 240 includes undesirable or annoying audible frequencies or tones. In such example, the example feedback circuit 145 may output an instruction to a user of the example haptic device 100, in block 850, instructing the user to adjust a fit of the example haptic device 100 to eliminate such undesired frequencies or tones.

As noted above, in some examples, the threshold differences are determined empirically by a user and stored in a memory device 246. The user of the example haptic device 100 is enabled to calibrate the example feedback circuit 145 to display, via example indicator 130, for example, threshold settings, suggested corrections to a position of or fit of the example haptic device 100. In some examples, the user of the example haptic device 100 is enabled to calibrate the example feedback circuit 145, responsive to any threshold difference, to adjust a target input signal waveform 210 to the haptic actuator 160 and/or to control an example position actuator 400 to adjust a position of one or more portions of the example haptic actuator 160 to produce output haptic vibrations 165 providing desired haptic effects to the user. In some examples, the haptic effect sensor 170 includes an optical sensor integrated into the illustrated haptic feedback loop to facilitate an adjustment of the fit of the example haptic device 100. In some examples, the example feedback circuit 145 is factory-calibrated to the form factor and function of the example haptic device 100, with threshold differences being set to values determined during development of the example haptic actuator 160 to provide a desired haptic effect to a sample population.

In some example use cases, users wear some wearable devices (e.g., biometric sensors, optical heart rate sensors, pressure sensors, temperature sensors, image sensors, etc.) too loosely or too tightly for the skin-facing sensors to function properly. Such use cases may advantageously include an example haptic device 100 including a haptic feedback loop, via the example feedback circuit 145, to provide an independent measurement of a fit of or a positioning of the wearable device at any given time. If the fit of or a position of the wearable device is incorrect (e.g., a position of the wearable device slips during movement of the user, etc.), the user can be guided, via guide signals or instructions, to adjust a tightness of and/or a position of the wearable device for to improve a performance of the skin-facing sensors. Thus, an indicator 130 can be used to generate a guide signal based on a difference between the measured haptic vibration waveform 241 and the target input signal waveform 210 to guide a user to modify a position of a wearable haptic device 100, such as to guide the user to tighten the wearable haptic device relative a body part of the user (e.g., wrist, arm, leg, head, torso, etc.) or to loosen the wearable haptic device relative to the body part.

FIG. 9 shows a flowchart representative of another example machine readable instructions which may be executed to yield an automated adjustment to a haptic device. In block 910, an output haptic vibration 165 is produced responsive to a target input signal waveform 210 to an example haptic actuator 160. In some examples, block 910 includes storing in a physical memory 246 a waveform, or a derivative thereof, corresponding to the output haptic vibration 165, or a portion thereof, produced by the haptic actuator 160 in response to the target input signal waveform 210.

In block 920, a haptic vibration 240 is measured by an example haptic effect sensor 170 located in proximity to the example haptic actuator 160, such as is shown in FIGS. 2-3 and 4A-4B. In some examples, block 920 includes storing in a physical memory 246 a waveform, or a derivative thereof, corresponding to the measured haptic vibration 240, or a portion thereof, sensed by the example haptic effect sensor 170.

In block 930, the measured haptic vibration waveform 241 is compared to the target input signal waveform 210. For instance, a measured haptic vibration 240 sensed by the example haptic effect sensor 170 is resolved into a measured haptic vibration waveform 241, which is compared to a target input signal waveform 210 used by an example haptic actuator 160 to generate the output haptic vibration 165. In some examples, this comparison of the measured haptic vibration waveform 241 to the target input signal waveform 210 includes a comparison between an amplitude and/or a frequency of the target input signal waveform 210 and an amplitude and/or a frequency of the measured haptic vibration waveform 241. This comparison between the target input signal waveform 210 and the measured haptic vibration waveform 241 may include any conventional technique for comparing waveforms or signals including, but not limited to a comparison in root-mean-square (RMS) levels, a comparison between impulsiveness of vibration (e.g., a difference between peak levels and RMS levels), a comparison between accelerations, a comparison between velocities, or a comparison between displacements, or a comparison of symmetry.

In some examples, the comparison between the measured haptic vibration waveform 241 and the target input signal waveform 210 may include a conversion of the measured haptic vibration 240 to a frequency domain using a transform to identify a range of sensed frequencies or to identify a dominant frequency within this range of sensed frequencies. Comparison between the measured haptic vibration waveform 241 and the target input signal waveform 210, or comparison of a first portion of the measured haptic vibration waveform 241 to a second portion of the measured haptic vibration waveform 241 may use any conventional techniques for vibration, waveform, signal or function analysis. In some examples, this transform may include a Fourier transform (e.g., fast Fourier transform (FFT), indirect Fourier transform, Fourier sine transform, fractional Fourier transform, etc.) or a wavelet transform (e.g., continuous wavelet transform, discrete wavelet transform, complex wavelet transform, etc.).

In some examples, block 930 includes identifying an audible frequency using the processor and block 940 includes modifying a target input signal waveform 210 to the example haptic actuator 160, using the example feedback circuit 145 (e.g., using the example waveform comparator and the example feedback analyzer 308), to eliminate an audible frequency component (e.g., audible to a user, etc.) determined from analysis of the measured haptic vibration waveform 241.

Following comparison of the measured haptic vibration waveform 241 and the target input signal waveform 210 in block 930, block 940 determines if a threshold difference exists between the measured haptic vibration waveform 241 and the target input signal waveform 210. If an output of block 940 is "YES," the feedback circuit 145 outputs an instruction to the adjustable input signal waveform 210 to adjust a target input signal waveform to the haptic actuator 160 and/or to adjust a position of the haptic actuator 160 (e.g., via a position actuator 400, etc.) to effect an adjustment to an output haptic vibration 165 to reduce a difference between the measured haptic vibration waveform 241 and the target input signal waveform 210 to cause a corresponding reduction in a difference between an output haptic vibration 165 and a haptic vibration measured by the haptic effect sensor 170. For example, the example feedback circuit 145 is to modify the target input signal waveform 210 to the haptic actuator 160 to reduce a difference between an amplitude and/or a frequency between the output haptic vibration 165 and the measured haptic vibration 240 or, stated differently, to reduce a difference between the measured haptic vibration waveform 241 and the target input signal waveform 210 and, correspondingly, a reduction in a difference between an output haptic vibration 165 and a haptic vibration measured by the haptic effect sensor 170.

Example changes to adjust an output haptic vibration 165 of the example haptic actuator 160 include, but are not limited to, one or more of a change in an amplitude or intensity of a target input signal waveform 210, a change in a frequency of a target input signal waveform 210, a change in an applied voltage to the example haptic actuator 160 and/or a change in a target input signal waveform 210 from a first waveform (e.g., a first pattern of vibration, etc.) to a second input signal waveform 210 (e.g., a first pattern of vibration, etc.). In another example, a change in an output haptic vibration 165 of the example haptic actuator 160 may include a cessation of a target input signal waveform 210 in favor of another output, such as an output to an example indicator 130 to alert a user to the existence of at least the threshold difference. For example, in a case where the example feedback circuit 145 determines in block 940 that the user is wearing an example haptic device 100 too loosely for the example haptic actuator 160 to convey the intended haptic effect via the output haptic vibration 165, the example feedback circuit 145 may use one or more example indicators 130 (e.g., sound, light, etc.) to gain the attention of the user.

In some examples, the changes to adjust an output haptic vibration 165 of the example haptic actuator 160 include controlling an example position actuator 400 to adjust a position of one or more portions of the example haptic actuator 160 to cause a change in a fit of the example haptic device 100 to the user, thereby affecting an interaction between the output haptic vibrations 165 and the user. For example, in block 940, the example feedback circuit 145 modifies a fit of a wearable device including an example haptic device 100, via an example position actuator 400, responsive to the difference between the measured haptic vibration waveform 241 and the target input signal waveform 210, wherein the wearable device includes a garment, footwear, headwear, eyewear, wrist wear, a vest, a band, a therapeutic device, an orthotic device, a medical device, a watch or a soft exosuit.

With respect to the adjusting of a position of an output haptic vibration 165 in block 950, an example haptic device 100, such as the example of FIG. 1, includes a plurality of example haptic actuators 160 spaced apart along the example band 120. If a fit of the example haptic device 100 is such that an output haptic vibration 165 to a first example haptic actuator 160 of the plurality of example haptic actuators produces a difference between the measured haptic vibration waveform 241 and the target input signal waveform 210 in excess of the threshold difference, the example feedback circuit 145 may then, for example, disable the first example haptic actuator 160 and cause a second example haptic actuator 160 of the plurality of example haptic actuators to produce the output haptic vibration 165. Since the second example haptic actuator 160 is in a different position that the first example haptic actuator 160, a degree of contact between the second example haptic actuator 160 and the user may be sufficient to convey the desired haptic effect, via the output haptic vibration 165, with a difference between the measured haptic vibration waveform 241 and the target input signal waveform 210 being below that of the threshold difference.

Continuing the above example, if the fit of the example haptic device 100 is such that an output haptic vibration 165 of the second example haptic actuator 160 also produces a difference between the measured haptic vibration waveform 241 and the target input signal waveform 210 in excess of the threshold difference, the example feedback circuit 145 may then, for example, disable the second example haptic actuator 160 and cause a third example haptic actuator 160 of the plurality of example haptic actuators to produce the output haptic vibration 165. Since the third example haptic actuator 160 is in a different position that the second example haptic actuator 160, a degree of contact between the third example haptic actuator 160 and the user may be sufficient to convey the desired haptic effect, via the output haptic vibration 165, with a difference between the measured haptic vibration waveform 241 and the target input signal waveform 210 being below that of the threshold difference.

If a difference between the measured haptic vibration waveform 241 and the target input signal waveform 210 is less than the threshold difference, an output of block 940 is "NO" and control passes back to block 910.

Figure 10:
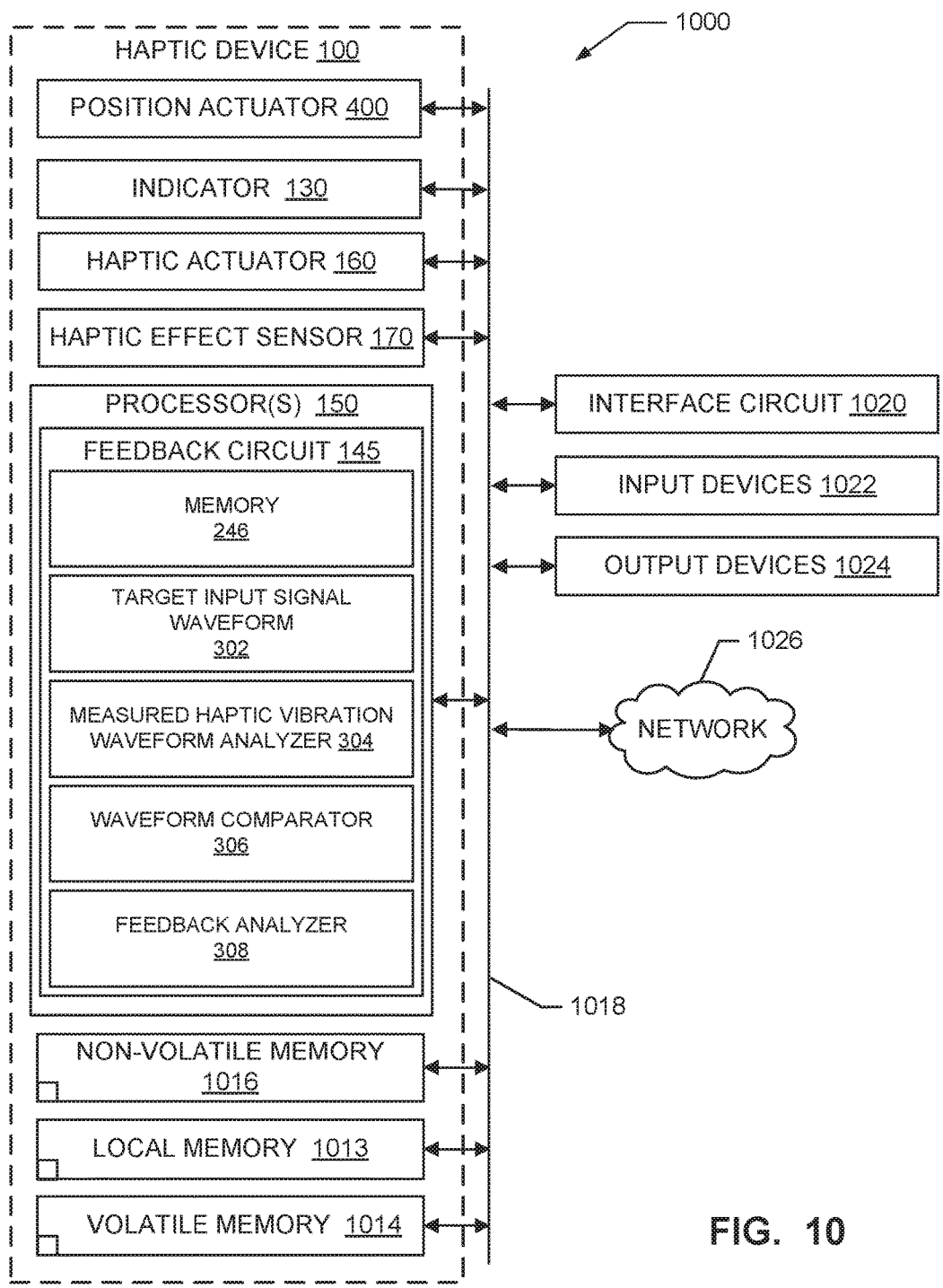
FIG. 10 is a block diagram illustrating an example implementation of an example processor platform which may execute the example instructions of FIGS. 8-9, to implement the example haptic devices of FIGS. 1-4B.

FIG. 10 is a block diagram of an example processor platform which may execute the example instructions of FIGS. 8-9, to implement the example feedback circuit 145 of the example haptic devices of FIGS. 1-4B. In some examples, a machine-readable medium includes a plurality of instructions that, in response to being executed on a computing device, cause the computing device to store in a memory 246 a first waveform corresponding to an output haptic vibration 165 produced by a haptic actuator 160 (e.g., a target input signal waveform 210), store in a memory 246 a second waveform corresponding to a measured haptic vibration 240 sensed by a haptic effect sensor 170 (e.g., measured haptic vibration waveform 241), compare the first waveform to the second waveform to determine one or more differences between the first waveform and the second waveform and modify a target input signal waveform to the haptic actuator 160 responsive to the one or more differences between the first waveform and the second waveform. In some examples, the plurality of instructions, in response to being executed on a computing device, cause the computing device to indicate, via an indicator 130, the one or more differences between the first waveform and the second waveform.

In some examples, a trigger of the computation of the difference between the output vibration 165 from the haptic actuator 160 and the measured haptic vibration 240 to determine a departure from a desired haptic effect can be continuously performed when the haptic actuator 160 is active, or done only in specific occasions, such as a detected change in a physical state of the user (e.g., movement, etc.), or triggered by a change in how the device is worn (e.g., a mechanical sensor, a capacitive sensor, or an optical sensor detecting a donning and/or doffing of the haptic device).

In some examples, the feedback circuit 145 imposes saturation (max/min excitation) conditions to the target input vibration waveform 210 to be applied to the haptic actuator 160 to avoid a haptic output that could exceed a threshold that could be harmful to the device or harmful, irritating, or annoying to the user of the device (e.g., too high stimulation) or that could be failed to be sensed at all (e.g., too low stimulation).

In various examples, the processor platform 1000 is, by way of example, a server, a desktop computer, a laptop computer, or a mobile device (e.g., a cell phone, a smart phone, a tablet such as an iPad™), or any other type of computing device.

The processor platform 1000 of the illustrated example includes a processor 150. The processor 150 of the illustrated example is hardware. For example, the processor 150 can be implemented by one or more integrated circuits, logic circuits, microprocessors or controllers from any desired family or manufacturer.

The processor 150 of the illustrated example includes a local memory 1013 (e.g., a cache). The processor 150 executes instructions to implement the example memory 246, the example target input signal waveform analyzer 302, the example measured haptic vibration waveform analyzer 304, the example waveform comparator 306, and the example feedback analyzer 308 of FIG. 3. The processor 150 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020 to connect external systems to the example haptic device 100. The interface circuit 1020 may be implemented by any type of hardwired or wireless interface standard such as, but not limited to, an Ethernet interface, a universal serial bus (USB), and/or a PCI express interface.

In the illustrated example, one or more input devices 1022 are connected to the interface circuit 1020 via bus 1018. The input device(s) 1022 permit(s) a user to enter data and commands into the processor 150. The input device(s) 1022 can be implemented by, for example, an audio sensor, a microphone, a camera (still or video), a keyboard, a button, a mouse, a touchscreen or touchpad, a track-pad, a trackball, isopoint and/or a voice recognition system. In the illustrated example of FIG. 1, an example input device 1022 may include a touchscreen provided in combination with indicator 130 (e.g., a touchscreen display device).

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). In some examples, the interface circuit 1020 includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

Example 1 a wearable device including a haptic actuator to produce an output haptic vibration in response to a target input signal waveform, a haptic effect sensor located in proximity to the haptic actuator to measure a haptic vibration corresponding to the output haptic vibration and to output a measured haptic vibration waveform and a feedback circuit to modify the target input signal waveform to reduce a difference between the output haptic vibration and the measured haptic vibration waveform.

Example 2 includes the wearable device as defined in Example 1, wherein the haptic effect sensor is disposed adjacent the haptic actuator.

Example 3 includes the wearable device as defined in any of Examples 1-2, wherein the haptic effect sensor is to sense an amplitude and a frequency of the haptic vibration.

Example 4 includes the wearable device as defined in any of Examples 1-3, wherein the feedback circuit includes a processor to convert the measured haptic vibration waveform to a frequency domain.

Example 5 includes the wearable device as defined in any of Examples 1-4, wherein the feedback circuit is to convert the measured haptic vibration waveform to a frequency domain using a transform to identify a range of sensed frequencies.

Example 6 includes the wearable device as defined in any of Examples 1-5, wherein the feedback circuit is to identify a dominant frequency in the range of sensed frequencies.

Example 7 includes the wearable device as defined in any of Examples 1-6, wherein the feedback circuit is to identify an audible frequency and the feedback circuit is to modify the target input signal waveform to eliminate the audible frequency from the output haptic vibration.

Example 8 includes the wearable device as defined in any of Examples 1-7, wherein the wearable device includes at least one of a garment, footwear, headwear, eyewear, wrist wear, a vest, a band, a therapeutic device, an orthotic device, a medical device, a watch, or a soft exosuit.

Example 9 includes the wearable device as defined in any of Examples 1-8, wherein the feedback circuit includes a processor to determine the difference between the target input signal waveform and the measured haptic vibration waveform.

Example 10 includes the wearable device as defined in any of Examples 1-9, and further includes an indicator to generate a guide signal based on the difference between the target input signal waveform and the measured haptic vibration waveform to guide a user to modify a position of the wearable device.

Example 11 includes the wearable device as defined in any of Examples 1-10, wherein the guide signal is to guide the user to at least one of tighten the wearable device relative a body part of the user or loosen the wearable device relative to the body part.

Example 12 includes the wearable device as defined in any of Examples 1-11, and further includes a second sensor and an indicator to generate a guide signal based on the difference between the target input signal waveform and the measured haptic vibration waveform to guide a user to modify a position of a second sensor.

Example 13 includes the wearable device as defined in any of Examples 1-12, wherein the second sensor is at least one of a biometric sensor, a biosensor, a temperature sensor, a pressure sensor, a heart rate sensor or a cardiac electrical potential waveform sensor.

Example 14 includes the wearable device as defined in any of Examples 1-13, wherein the haptic effect sensor includes at least one of a load cell, an infrared sensor, an optical sensor, a capacitive sensor, an accelerometer, a piezoelectric sensor, a strain gauge, or a transducer to sense at least one of displacement, force or acceleration.

Example 15 includes the wearable device as defined in any of Examples 1-14, wherein the wearable device is at least one of a virtual reality device or an augmented reality device.

Example 16 includes the wearable device as defined in any of Examples 1-15, wherein the haptic actuator is a first haptic actuator disposed on a first portion of the device, the haptic effect sensor includes a first sensor disposed adjacent to the first haptic actuator and further including a second haptic actuator disposed on a second portion of the device and a second sensor disposed adjacent to the second haptic actuator, the feedback circuit to modify an input to the second haptic actuator based on a difference between a second input signal waveform and a second measured haptic vibration waveform sensed by the second sensor.

Example 17 includes the wearable device as defined in any of Examples 1-16, wherein the haptic actuator includes a piezoelectric device or an electroactive polymer.

Example 18 includes the wearable device as defined in any of Examples 1-17, and further includes a position actuator to move at least a portion of the wearable device from a first position to a second position responsive to the difference between the target input signal waveform and the measured haptic vibration waveform.

Example 19 includes the wearable device as defined in any of Examples 1-18, wherein the position actuator is to move the at least the portion of the wearable device to modify a fit of the wearable device.

Example 20 is a method including storing a target input signal waveform to a haptic actuator, storing a measured haptic vibration waveform corresponding to a vibration sensed by a haptic effect sensor in a proximity of the haptic actuator and using a feedback circuit, modifying the target input signal waveform to reduce a difference between the target input signal waveform and the measured haptic vibration waveform.

Example 21 includes the method as defined in Example 20, and further includes using the feedback circuit, modifying the target input signal waveform to reduce a difference between at least one of an amplitude and a frequency between the target input signal waveform and the measured haptic vibration waveform.

Example 22 includes the method as defined in Example 20 or Example 21, and further includes using the feedback circuit, modifying the target input signal waveform to reduce a difference in amplitude and a difference in frequency between the target input signal waveform and the measured haptic vibration waveform.

Example 23 includes the method as defined in any of Examples 21-22, and further includes converting the measured haptic vibration waveform to a frequency domain using a processor.

Example 24 includes the method as defined in any of Examples 21-23, and further includes transforming the measured haptic vibration waveform to a frequency domain, via a processor, to identify a range of sensed frequencies.

Example 25 includes the method as defined in any of Examples 21-24, and further includes identifying a dominant frequency in the range of sensed frequencies using the processor.

Example 26 includes the method as defined in any of Examples 21-25, and further includes identifying an audible frequency using the processor and modifying the target input signal waveform, using the feedback circuit, to eliminate the audible frequency from an output haptic vibration from the haptic actuator.

Example 27 includes the method as defined in any of Examples 21-26, and further includes determining a difference between the target input signal waveform and the measured haptic vibration waveform using a feedback circuit processor.

Example 28 includes the method as defined in any of Examples 21-27, wherein the haptic actuator, the haptic effect sensor and the feedback circuit are included in a wearable device including at least one of a garment, footwear, headwear, eyewear, wrist wear, a vest, a band, a therapeutic device, an orthotic device, a medical device, a watch or a soft exosuit.

Example 29 includes the method as defined in any of Examples 21-28, and further includes displaying a guide signal, via an indicator, based on a difference between the target input signal waveform and the measured haptic vibration waveform to guide a user to modify a position of the wearable device.

Example 30 includes the method as defined in any of Examples 21-29, and further includes generating an audible guide signal based on the difference between the target input signal waveform and the measured haptic vibration waveform to guide a user to modify a position of the wearable device.

Example 31 includes the method as defined in any of Examples 21-30, wherein the haptic device includes a biometric sensor, biosensor, temperature sensor, pressure sensor, heart rate sensor or cardiac electrical potential waveform sensor.

Example 32 includes the method as defined in any of Examples 21-31, wherein the haptic effect sensor includes at least one of a load cell, an infrared sensor, an optical sensor, a capacitive sensor, an accelerometer, a piezoelectric sensor, a strain gauge, or a transducer to sense at least one of displacement, force or acceleration.

Example 33 includes the method as defined in any of Examples 21-32, wherein the haptic actuator includes a piezoelectric device or an electroactive polymer.

Example 34 includes the method as defined in any of Examples 21-33, and further includes driving the haptic actuator using a haptic driver.

Example 35 includes the method as defined in any of Examples 21-34, and further includes using the feedback circuit, modifying a target input signal waveform to a second haptic actuator responsive to the difference between the target input signal waveform and the measured haptic vibration waveform.

Example 36 includes the method as defined in any of Examples 21-35, and further includes modifying a fit of a wearable device, via a position actuator, responsive to the between the target input signal waveform and the measured haptic vibration waveform, wherein the wearable device includes at least one of a garment, footwear, headwear, eyewear, wrist wear, a vest, a band, a therapeutic device, an orthotic device, a medical device, a watch or a soft exosuit.

Example 37 is a device including an actuating means for producing an output haptic vibration in response to a target input signal waveform, a sensing means located in proximity to the actuating means for sensing a measured haptic vibration and outputting a measured haptic vibration waveform and a feedback circuit means for modifying the target input signal waveform to reduce a difference between the target input signal waveform and the measured haptic vibration waveform.

Example 38 includes the device as defined in Example 37, wherein the sensing means is disposed adjacent the actuating means.

Example 39 includes the device as defined in Example 37 or Example 38, wherein the device includes at least one of a garment, footwear, headwear, eyewear, wrist wear, a vest, a band, a therapeutic device, an orthotic device, a medical device, a watch, or a soft exosuit.

Example 40 includes the device as defined in any of Examples 37-39, and further includes an actuating means for modifying a position of the device from a first position to a second position responsive to feedback circuit means.

Example 41 includes the device as defined in any of Examples 37-40, wherein the sensing means is to sense at least one of an amplitude of the measured haptic vibration waveform or a frequency of the measured haptic vibration waveform.

Example 42 includes the device as defined in any of Examples 37-41, wherein the feedback circuit means includes a processing means for converting the measured haptic vibration waveform to a frequency domain.

Example 43 includes the device as defined in any of Examples 37-42, wherein the processing means is to convert the measured haptic vibration waveform to a frequency domain using a transform to identify a range of sensed frequencies.

Example 44 includes the device as defined in any of Examples 37-43, wherein the processing means is to identify a dominant frequency in the range of sensed frequencies.

Example 45 includes the device as defined in any of Examples 37-44, wherein the processing means is to identify an audible frequency and the feedback circuit means is to modify the target input signal waveform to eliminate the audible frequency from the output haptic vibration.

Example 46 includes the device as defined in any of Examples 37-45, wherein the feedback circuit means is further to output to an indicator means at least one of a visual indication, a tactile indication, or an audible indication of the difference between the target input signal waveform and the measured haptic vibration waveform to guide a user to adjust the device.

Example 47 includes the device as defined in any of Examples 37-46, and further includes a second actuating means disposed on a second portion of the device and a second sensing means disposed adjacent to the second actuating means, wherein the feedback circuit means is further to modify an input to the second actuating means responsive to the difference between the target input signal waveform and the measured haptic vibration waveform.

Example 48 includes the device as defined in any of Examples 37-47, the device including a robot end effector having the actuating means and the sensing means disposed in at least a portion of the robot end effector.

Example 49 is at least one machine readable medium including a plurality of instructions that in response to being executed on a computing device, cause the computing device to store a target input signal waveform corresponding to an output haptic vibration produced by a haptic actuator, store a measured haptic vibration waveform corresponding to a measured haptic vibration sensed by a haptic effect sensor, compare the target input signal waveform to the measured haptic vibration waveform to determine one or more differences between the target input signal waveform and the measured haptic vibration waveform, and modify a target input signal waveform to the haptic actuator responsive to the one or more differences between the target input signal waveform and the measured haptic vibration waveform.

Example 50 includes the at least one machine readable medium as defined in Example 49, the plurality of instructions, in response to being executed on a computing device, cause the computing device to indicate, via an indicator, the one or more differences between the target input signal waveform and the measured haptic vibration waveform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

From at least the foregoing, it will be appreciated that example methods, apparatus and articles of manufacture disclosed herein provide an example feedback circuit for a haptic device, such as a wearable haptic device. Responsive to one or more sensor measurements correlated to a desired haptic effect, the example feedback circuit is to adjust one or more characteristics of a haptic actuator (e.g., an amplitude or intensity, a frequency, a location, etc.) and/or one or more characteristics of the example haptic device (e.g., a fit of the haptic device to a user, a position of one or more components of the haptic device, etc.) to provide the desired haptic effect. This is to be contrasted with conventional LRA driver chips, which drive the resonant frequency of the LRA to maximize vibration amplitude, and conventional ERM driver chips, which measure back EMF of the motor to implement automatic overdrive and braking. Such conventional techniques fail to measure a haptic effect and correspondingly fail to use a sensed haptic effect as a control input.

What is claimed is:
1. A wearable device, comprising:
   a haptic actuator to produce an output haptic vibration in response to a target input signal waveform;
   a haptic effect sensor located in proximity to the haptic actuator to measure an amplitude and a frequency of a haptic vibration corresponding to the output haptic vibration and to output a measured haptic vibration waveform; and
   a feedback circuit to:
      transform the measured haptic vibration waveform to a frequency domain to identify a range of sensed frequencies; and
      modify the target input signal waveform to reduce a difference between the output haptic vibration and the measured haptic vibration waveform.
2. The wearable device according to claim 1, wherein the haptic effect sensor is disposed adjacent the haptic actuator.
3. The wearable device according to claim 1, wherein the feedback circuit includes a processor to convert the measured haptic vibration waveform to the frequency domain.
4. The wearable device according to claim 1, wherein the feedback circuit is to identify a dominant frequency in the range of sensed frequencies.
5. The wearable device according to claim 1, wherein the wearable device includes at least one of a garment, footwear, headwear, eyewear, wrist wear, a vest, a band, a therapeutic device, an orthotic device, a medical device, a watch, or a soft exosuit.

6. The wearable device according to claim 1, wherein the feedback circuit includes a processor to determine the difference between the target input signal waveform and the measured haptic vibration waveform.

7. The wearable device according to claim 1, wherein the haptic actuator is a first haptic actuator disposed on a first portion of the device, the haptic effect sensor includes a first sensor disposed adjacent to the first haptic actuator and further including:
 a second haptic actuator disposed on a second portion of the device; and
 a second sensor disposed adjacent to the second haptic actuator, the feedback circuit to modify an input to the second haptic actuator based on a difference between a second input signal waveform and a second measured haptic vibration waveform sensed by the second sensor.

8. The wearable device according to claim 1, further including a position actuator to move at least a portion of the wearable device from a first position to a second position responsive to the difference between the target input signal waveform and the measured haptic vibration waveform.

9. A method, comprising:
 storing a target input signal waveform for a haptic actuator;
 storing a measured haptic vibration waveform corresponding to a vibration sensed by a haptic effect sensor in a proximity of the haptic actuator;
 transforming the measured haptic vibration waveform to a frequency domain, via a processor, to identify a range of sensed frequencies; and
 using a feedback circuit, modifying the target input signal waveform to reduce a difference in amplitude and a difference in frequency between the target input signal waveform and the measured haptic vibration waveform.

10. The method according to claim 9, wherein the transforming of the measured haptic vibration waveform includes transforming the measured haptic vibration waveform with the processor.

11. The method according to claim 9, wherein the haptic actuator, the haptic effect sensor and the feedback circuit are included in a wearable device including at least one of a garment, footwear, headwear, eyewear, wrist wear, a vest, a band, a therapeutic device, an orthotic device, a medical device, a watch or a soft exosuit.

12. A device, comprising:
 actuating means for producing an output haptic vibration in response to a target input signal waveform;
 sensing means located in proximity to the actuating means for sensing a haptic vibration amplitude and frequency and for outputting a measured haptic vibration waveform; and
 a feedback circuit to:
  transform the measured haptic vibration waveform to a frequency domain to identify a range of sensed frequencies; and
  modify the target input signal waveform to reduce a difference between the target input signal waveform and the measured haptic vibration waveform.

13. The device according to claim 12, further including: actuating means for modifying a position of the device from a first position to a second position responsive to the feedback circuit.

14. The device according to claim 12, further including a robot end effector, the actuating means and the sensing means disposed in at least a portion of the robot end effector.

* * * * *